C. G. BRANSTRATOR.
POWER TRANSMISSION.
APPLICATION FILED APR. 29, 1920.
1,426,035.
Patented Aug. 15, 1922.
5 SHEETS—SHEET 4.
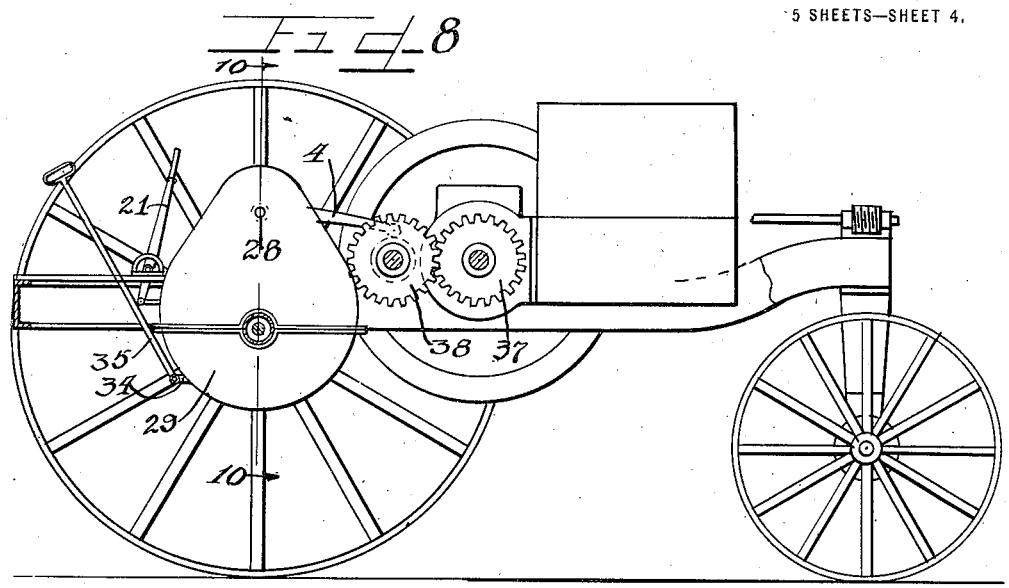
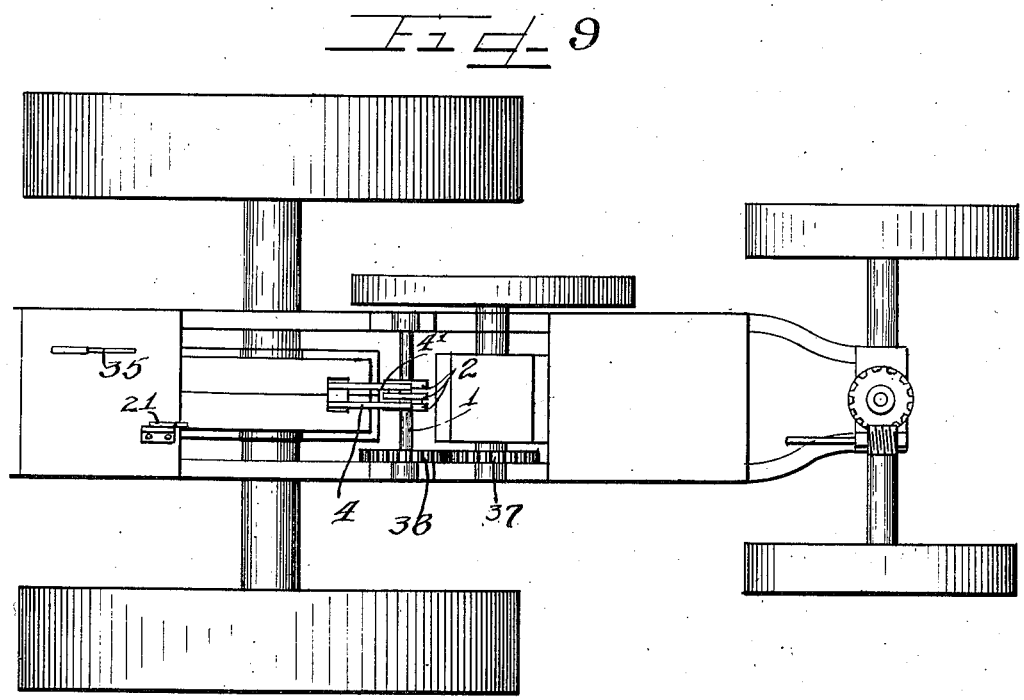

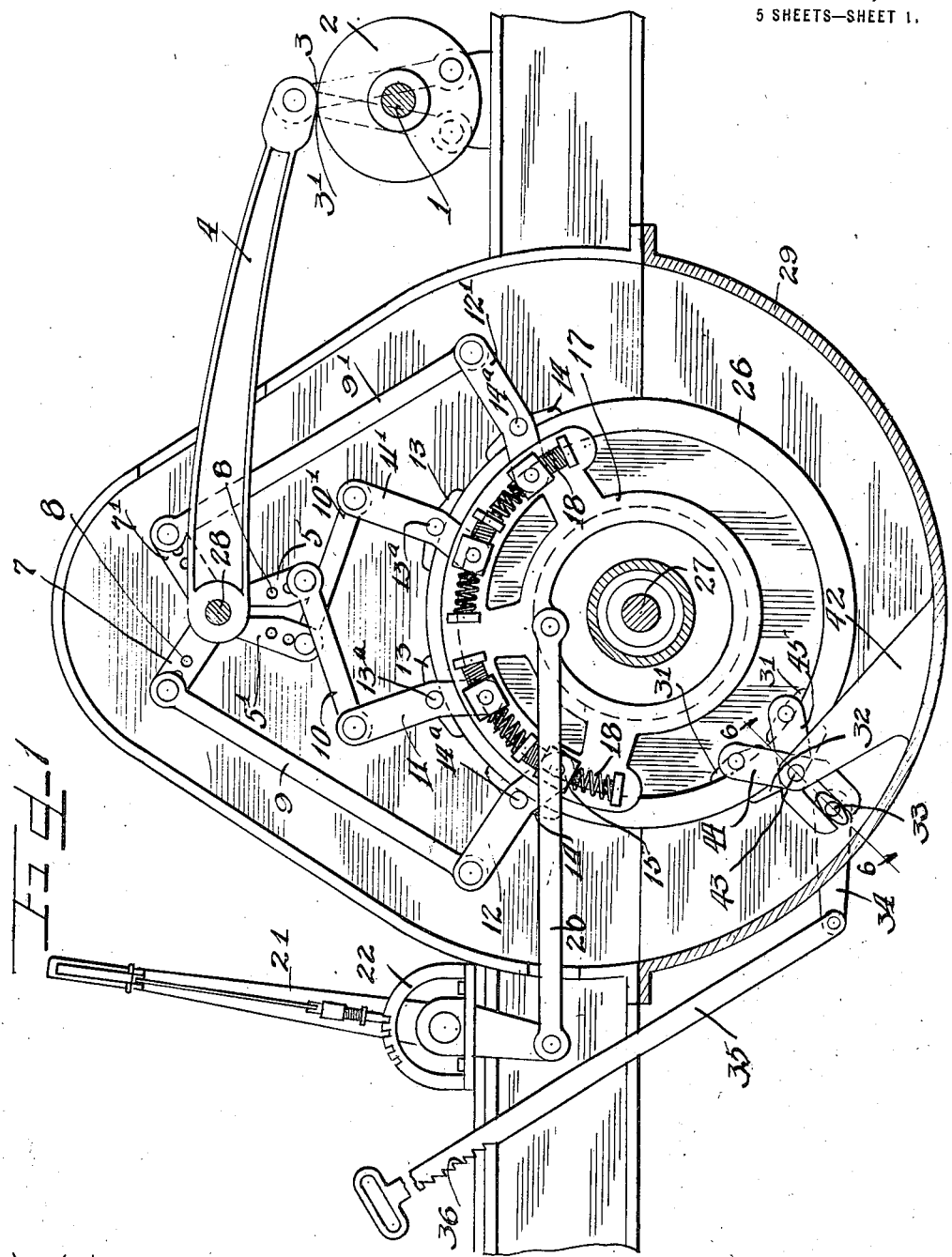

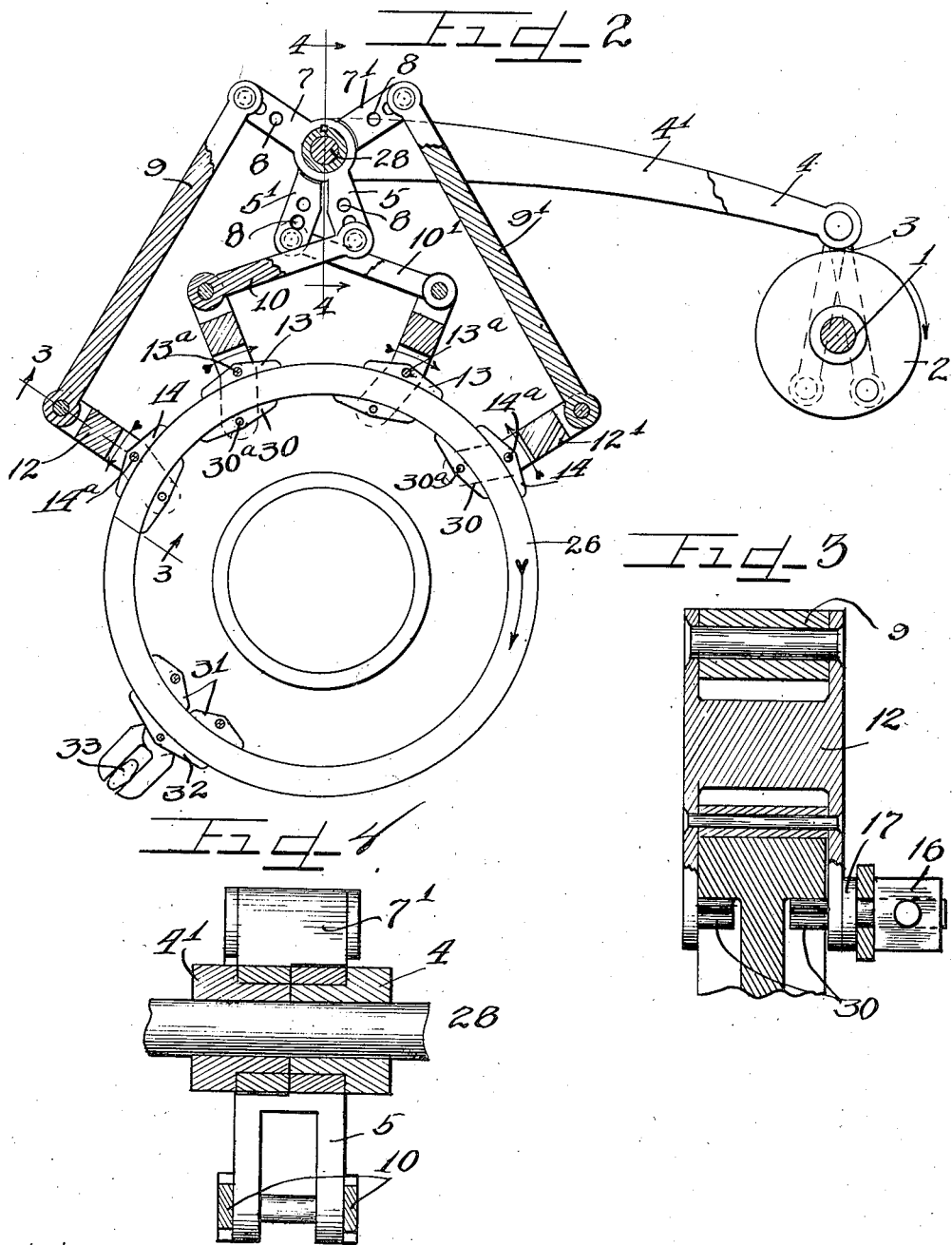

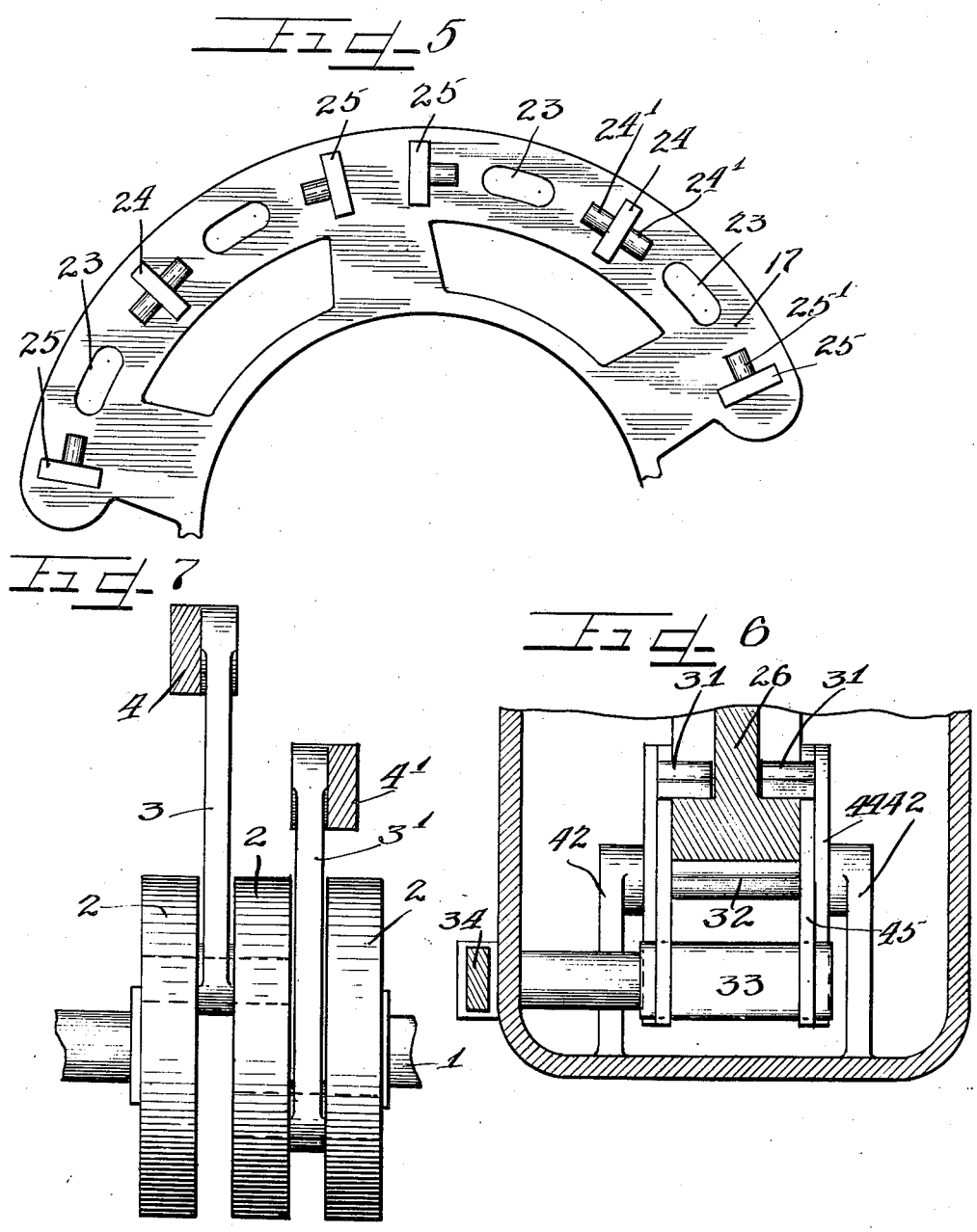

C. G. BRANSTRATOR.
POWER TRANSMISSION.
APPLICATION FILED APR. 29, 1920.

1,426,035.

Patented Aug. 15, 1922.
5 SHEETS—SHEET 5.

Witnesses
J. W. Angell
Charles W. Hills Jr.

Inventor
Clement G. Branstrator.
by Charles O. Hills
Atty.

UNITED STATES PATENT OFFICE.

CLEMENT G. BRANSTRATOR, OF BUSHNELL, ILLINOIS, ASSIGNOR OF ONE-FOURTH TO JOHN C. HOEHNEN AND ONE-FOURTH TO GEORGE G. BAYNE, BOTH OF BUSHNELL, ILLINOIS, AND ONE-FOURTH TO BAYNE MANUFACTURING COMPANY, OF BUSHNELL, ILLINOIS, A CORPORATION OF ILLINOIS.

POWER TRANSMISSION.

1,426,035.  Specification of Letters Patent.  Patented Aug. 15, 1922.

Application filed April 29, 1920. Serial No. 377,426.

*To all whom it may concern:*

Be it known that I, CLEMENT G. BRANSTRATOR, a citizen of the United States, and a resident of the city of Bushnell, in the county of McDonough and State of Illinois, have invented certain new and useful Improvements in a Power Transmission; and I do hereby declare that the following is a full, clear, and exact description of the same, reference being had to the accompanying drawings, and to the numerals of reference marked thereon, which form a part of this specification.

This invention relates primarily to a novel friction drive in which a plurality of intermittently operated devices contact with the driven member.

It has for one of its objects the construction of a friction drive in which a single operating power lever produces rotation of a driven member upon both the forward and return strokes thereof.

Another object of the invention is to provide for the adjustability of the throws of said mechanism.

A further object of the invention consists in a novel reversing mechanism whereby the various friction devices are simultaneously reversed for driving the driven member in a reverse direction.

Other objects and advantages exist in the novel structure and arrangement of parts as herein more specifically pointed out.

On the drawings—

Fig. 1 is a central elevational view partly in section showing my improved friction drive and the operating mechanism therefor.

Fig. 2 shows the driven member, the friction shoes, and operating mechanism therefor in detached form.

Fig. 3 is a section on the line 3—3 of Fig. 2.

Fig. 4 is a section on the line 4—4 of Fig. 2.

Fig. 5 is a plan view of a detail of the reversing mechanism.

Fig. 6 is a section on the line 6—6 of Fig. 1 showing the application of the brake mechanism.

Fig. 7 is substantially a perspective view of the driving mechanism.

Fig. 8 shows a perspective view of a tractor and the application of my invention thereto.

Fig. 9 is a top plan view of the same.

As shown on the drawings—

Figure 10:
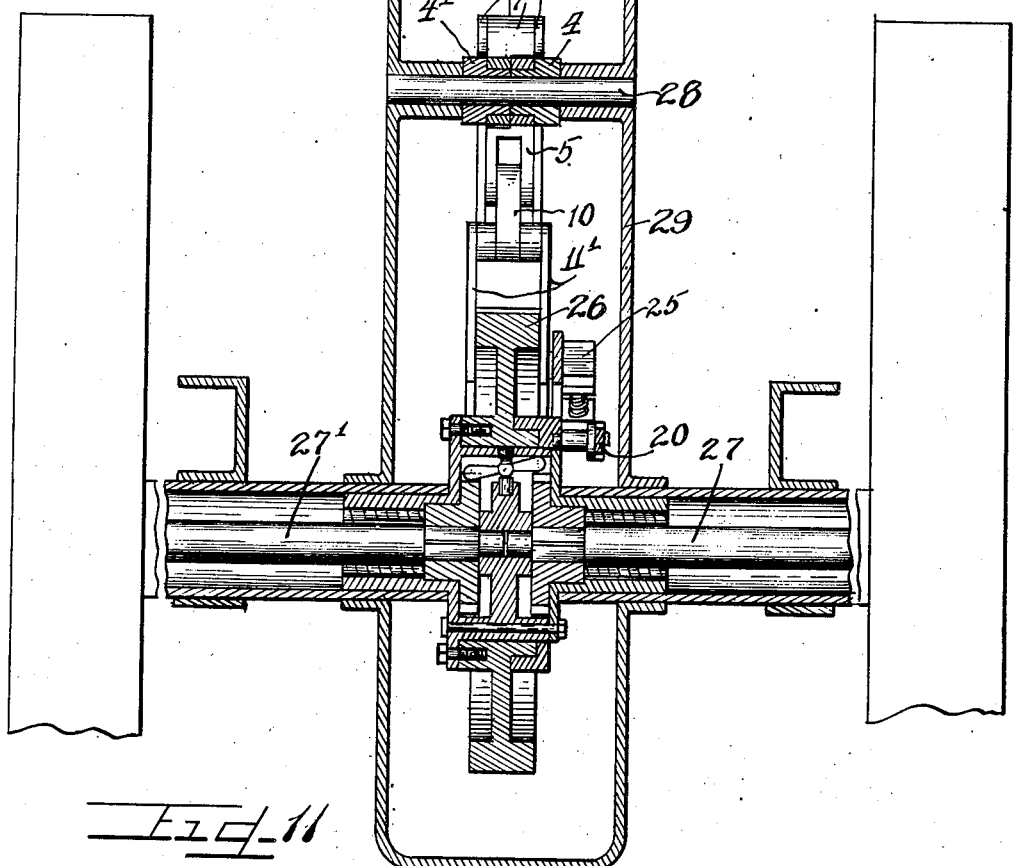
Fig. 10 is a section on the line 10—10 of Fig. 8.
Figure 11:
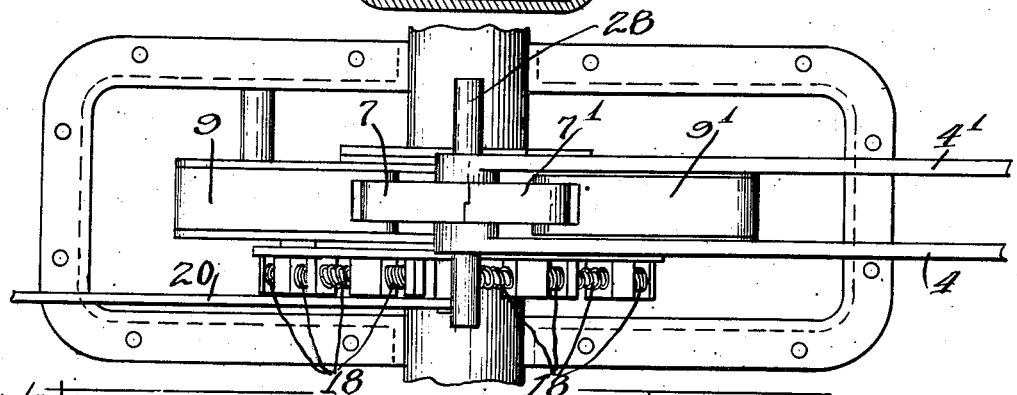
Fig. 11 is a view of the rear axle with the upper casing removed, showing in perspective the pivot rod for the driving mechanism.

Referring now in detail to the drawings, especially Figs. 1 and 2, the reference numeral 1 indicates a driving member having a disk or a plurality of disks 2 thereon to which are connected a plurality of links 3 and 3' at different angular relations. These links are attached to operating levers 4 and 4' the opposite ends of which are connected to bell cranks pivoted upon a shaft 28 which is supported in casing 29. These bell crank levers have overlapping parts as shown in Fig. 4 to bring the arms thereof in operative relation to the driven member. Each bell crank has two arms, each having a plurality of holes 8 for varying the adjustment of the driving links attached thereto. It will be noted that arm 4 connects with bell crank having arms 5 and 7, and lever 4' connects with bell crank having arms 5' and 7'. Friction members are connected to each bell crank for driving the driven member 26, which in the present instance consists of the differential driving member (Figure 10) which drives the rear axles 27 and 27' through the usual and well known differential gearing. It will be noted that a pair of links 9 and 10 are respectively pivoted to the arms 7 and 5 of the first-mentioned bell crank and at the ends of said links, holding members 12 and 11 are respectively pivoted to links 9 and 10. Said holding members embrace the flanged driven wheel 26 and each has a pair of shoes 30 projecting inwardly below the flange of said wheel and supported by pivots 30ª. Friction members 13 and 14 of any approved form are secured respectively to members 11 and 12 in proximity to the outer periphery of the driven wheel and are alternately effective. Likewise, links 10' and 9' are respectively pivoted to arms 5' and 7', and to holding members 11' and 12' to which upper shoes 13 and 14 are respectively pivoted, and lower shoes 30 are pivoted below said wheel. This driven wheel or member is mounted on a shaft 27 which might be the rear differential drive of a tractor or any other shaft that it may be desired to drive.

The gripping action of the friction shoes or members is accomplished as follows: The distance between the upper and lower friction shoes on each holding member is greater than the thickness of the flange on the driven member, so there is no gripping action if the pivots of said upper and lower shoes lie in the same radius of the driven wheel or in substantially the same radius. But if the lower shoes on a holding member be held momentarily in substantially a fixed position while the upper shoe moves in one direction, the upper shoe will quickly come into frictional or gripping contact with the outer periphery of the driven wheel. Therefore, when a holding member is moving idly, it is necessary that the lower shoes travel at substantially the same speed as the upper shoe, and at the end of said idle stroke, when the holding member starts to return, it is necessary that the lower shoes be held momentarily or retarded relatively to the speed of the upper shoe on its return, in order to effect a gripping action. Springs 18 have been employed to move the lower shoes at substantially the same rate of speed as the upper shoes on the idle stroke and to momentarily hold a lower shoe or at least retard it upon the return stroke in order to effect a gripping action. It will be noted that the lower end of each holding member has a spring 18 on each side of pivot 30ª, one spring being active when the driven member is rotated in one direction, and the other spring being active when the driven member is rotated in the other direction. As shown in Fig. 1 the springs 18 on the right hand side of the lower end of each holding member are under compression. The driven member 26 is now being driven in clockwise rotation, and each spring under compression is forcing the lower end of a holding member in a counter clockwise direction and in opposition to the upper end of such holding members as are moving in a clockwise direction, for imparting rotation to the driven member. Consequently, the action of said springs will tend to produce a firm gripping relation between the upper and lower shoes on the effective strokes of the holding members, and at the end of each effective stroke of said holding members, when the return stroke begins, the said compressed springs 18 will be effective to move the lower end of each such holding member in a counter-clockwise direction, so that no gripping action can occur on the back stroke.

Mounted on the shaft 27 is the reversing mechanism, which consists of a member having a segment at its upper end, said segment having a plurality of slots 23 and abutments 24 and 25 (see Fig. 5). Said abutments have studs 24' and 25' respectively. It will be seen especially in Fig. 3 that on one side of the driven member the pivots 30ª extend through slots 23 of the reversing member and have securing means thereon such as nuts 16. The springs 18 are inserted between the nuts and the aforesaid abutments and are held in place by the studs on said abutments. A link 20 is connected to the reversing member at one end and at its opposite end is connected to an operating lever 21 which is mounted upon the frame of the machine and held in adjusted position by a latch cooperating with a lock segment 22 of usual construction. By moving the lever 21 to the left from the position shown in Fig. 1, the reversing member will be rotated to the right, bringing the lower end of each holding member nearer to the left hand end of said slots 23 so that the springs 18 on the left hand side of said holding member will come into play, and thus the shoes will grip upon reverse movement.

In order to stop the mechanism at any desired period, a brake mechanism has been provided which consists of a toggle mechanism comprising arms 44 and 45 pivoted at 43 upon the stationary bracket 42 within the casing member. Shoes 31 are pivoted upon the interior terminals of said arms and a shoe 32 is pivoted exteriorly of the driven member where said arms cross each other. A cam member 33 operates between the two outer terminals of the jaw formed by the two arms as shown in Fig. 1. This cam is operated by means of an arm 34 which is operated by link 35. Link 35 has teeth 36 for holding it in an adjusted position.

Figs. 8, 9, 10, and 11 show the application of my invention as applied to a tractor. In Fig. 10 is shown the differential upon the rear axle on which is mounted the driven wheel 26 in a closed casing member 29 which also forms a support for shaft 28 from which the operating links for the friction shoe are suspended. A pair of intermeshing gears 37 and 38 or any other appropriate devices may be used for operating the connecting links 4 and 4' for driving the friction members.

The operation is as follows:

When driving shaft 1 is rotated, motion will be imparted to links 4 and 4' at different angularity. As lever 4 is raised, it will operate the bell crank lever connected therewith. Arm 7 descends carrying friction member 14 idly downwards while arm 5 will swing upwardly to the right, causing friction member 13 to engage the driven member and rotate it to the right; and as link 4 returns, friction member 14 will be effective to continue the rotation of the driven member. The friction members connected to the other bell crank lever operate in substantially the same way except that they are operated in a phase which may be either behind or in advance of the other, and if the friction members are reversed by the reversing mechanism as previously set forth, the action of the friction members will be reversed.

It will thus be seen that I have devised a novel friction drive in which a pair of bell crank levers are operated to bring the two sets of friction members into overlapping action and in which the operation of a single bell-crank lever is effective to produce rotation of the driven member in both the forward and return strokes of the power lever which operates it and in which the holding members are resiliently held on the reversing member, and in which the effective stroke of the friction members may be varied without varying the stroke of the driven power levers 4 and 4' and in which a pair of bell crank levers are so mounted as to bring the arms thereof in operative relation to the driven member.

While I am aware that numerous changes and details of construction may be varied without departing from the spirit of this invention, I do not contemplate limiting my invention to the embodiment illustrated except in so far as it is limited by the prior art and the scope of the appended claims.

I claim as my invention—

1. In a device of the class described, a plurality of friction driving members having pivots at their lower ends, a reversing member having slots through which said pivots extend, said reversing member also having abutments, springs between said pivots and abutments, and means to shift said reversing member to simultaneously reverse the action of said friction members.

2. In a transmission mechanism, a circular driven member having a flanged rim, a plurality of forked holding members embracing said rim, friction shoes secured to said holding members above said rim, a pair of friction shoes secured to each holding member below said rim, one on each side of said rim, and means for operating said holding members.

3. In a transmission mechanism, a driven wheel having a peripheral flange, a pair of alternately acting friction devices engaging the flange of said wheel, each friction device comprising an upper friction shoe, a pair of lower friction shoes, a freely floating holding member for supporting said shoes, and yielding means operatively associated with the lower end of each holding member for retarding or shifting said lower end for varying the effective distance between said upper and lower shoes during the operation of said devices.

4. In a transmission mechanism, a driven wheel, a support, a pair of bell-crank levers revoluble on said support, a pair of alternately acting friction devices connected to each bell-crank lever and operatively associated with said wheel, each friction device comprising a freely floating holding member embracing said wheel, upper and lower friction shoes secured to said member, and yielding means in operative relation with the lower end of each holding member for controlling the operative relation of said shoes with respect to said driven wheel.

In testimony whereof I have hereunto subscribed my name in the presence of two subscribing witnesses.

CLEMENT G. BRANSTRATOR.

Witnesses:
JOHN C. HOEHNEN,
GEORGE G. BAYNE.